United States Patent [19]

Palara

[11] Patent Number: 5,210,675
[45] Date of Patent: May 11, 1993

[54] CIRCUIT FOR PROTECTION AGAINST NEGATIVE OVERVOLTAGES ACROSS THE POWER SUPPLY OF AN INTEGRATED CIRCUIT COMPRISING A POWER DEVICE WITH RELATED CONTROL CIRCUIT

[75] Inventor: Sergio Palara, Acicastello, Italy

[73] Assignee: SGS-Thomson Microelectronics s.r.l., Milan, Italy

[21] Appl. No.: 928,670

[22] Filed: Aug. 17, 1992

Related U.S. Application Data

[63] Continuation of Ser. No: 547,233, Jul. 3, 1990, abandoned.

[30] Foreign Application Priority Data

Jul. 11, 1989 [IT] Italy ................................ 21150 A/89

[51] Int. Cl.[5] .............................................. H02H 7/09
[52] U.S. Cl. ...................................... 361/91; 361/111; 323/284; 307/296.6
[58] Field of Search ...................... 361/88, 90, 91, 111; 323/284, 289; 307/270, 296.1, 296.6

[56] References Cited

U.S. PATENT DOCUMENTS

| | | | |
|---|---|---|---|
| 4,471,237 | 8/1982 | Kaplan | 307/443 |
| 4,499,673 | 3/1983 | Garrett | 361/56 |
| 4,679,112 | 7/1987 | Craig | 361/91 |
| 4,808,839 | 4/1988 | Dunn et al. | 307/296.4 |
| 4,845,420 | 7/1989 | Oshizawa | 323/284 |
| 4,962,346 | 10/1990 | Maggioni | 307/270 |

FOREIGN PATENT DOCUMENTS 83060 of 0000 European Pat. Off. .

Primary Examiner—A. D. Pellinen
Assistant Examiner—Ronald W. Leja
Attorney, Agent, or Firm—Griffin Butler Whisenhunt & Kurtossy

[57] ABSTRACT

Circuits are provided for protecting against negative overvoltages of a power supply in an integrated circuit including a power device (P). The protection circuits include a voltage limiting device (T4) interposed between supply and control terminals of the power device, as well as a switching device (T6). The switching device is interposed between a control terminal of the voltage limiting means and ground. The switching means is controlled by the power supply to cause conduction of the voltage limiting means for firing the power device if a positive overvoltage on the supply terminal (CL) of the power device is combined with a negative overvoltage of the power supply (Vb). In some embodiments the switching device and the voltage limiting device are both NPN transistors. In other embodiments the the switching device and the voltage limiting device are both MOS transistors.

8 Claims, 3 Drawing Sheets

CIRCUIT FOR PROTECTION AGAINST NEGATIVE OVERVOLTAGES ACROSS THE POWER SUPPLY OF AN INTEGRATED CIRCUIT COMPRISING A POWER DEVICE WITH RELATED CONTROL CIRCUIT

This application is a continuation, of Ser. No. 07/547,233, filed Jul. 3, 1990, now abandoned.

BACKGROUND

I. Field of the Invention

The present invention relates to a circuit for protection against negative overvoltages across the power supply of an integrated circuit comprising a power device with related control circuit.

II. Prior Art and Other Considerations.

It is well known that power devices, together with the related control circuits, are used for driving loads of various types. If it is an inductive load, as in the case of a power device used in motor car applications, the cutoffs of the power device determine positive overvoltages across the power device itself which are normally absorbed by means of appropriate limiting devices such as zener diodes. It can, however, occur that such positive overvoltages across the power device combine with negative overvoltages across the source of the power supply, say, a motor vehicle's battery. In such cases, if the power device and the related control circuit are accomplished in the form of an integrated circuit, the parasite transistor formed between the collector of the power device and the power supply source can burn out.

The object of the present invention is to endow the integrated circuit with an adequate protection against the drawbacks due to such negative overvoltages.

SUMMARY

According to the invention such object is attained with a protection circuit, characterized in that it comprises a switch sensitive to negative overvoltages across the power supply and suitable for enabling a limiter of the voltage applied across the power device.

In this way, whenever a negative overvoltage across the power supply combines with a positive overvoltage across the power device, the latter is suitably limited, thus safeguarding the parasite transistor formed, as already said, in the integrated circuit.

BRIEF DESCRIPTION OF THE DRAWING

The features of the present invention shall be made more evident by the following detailed description of some of its embodiments illustrated as non-limiting examples in the enclosed drawings, wherein.

DETAILED DESCRIPTION OF THE DRAWINGS

Figure 1:
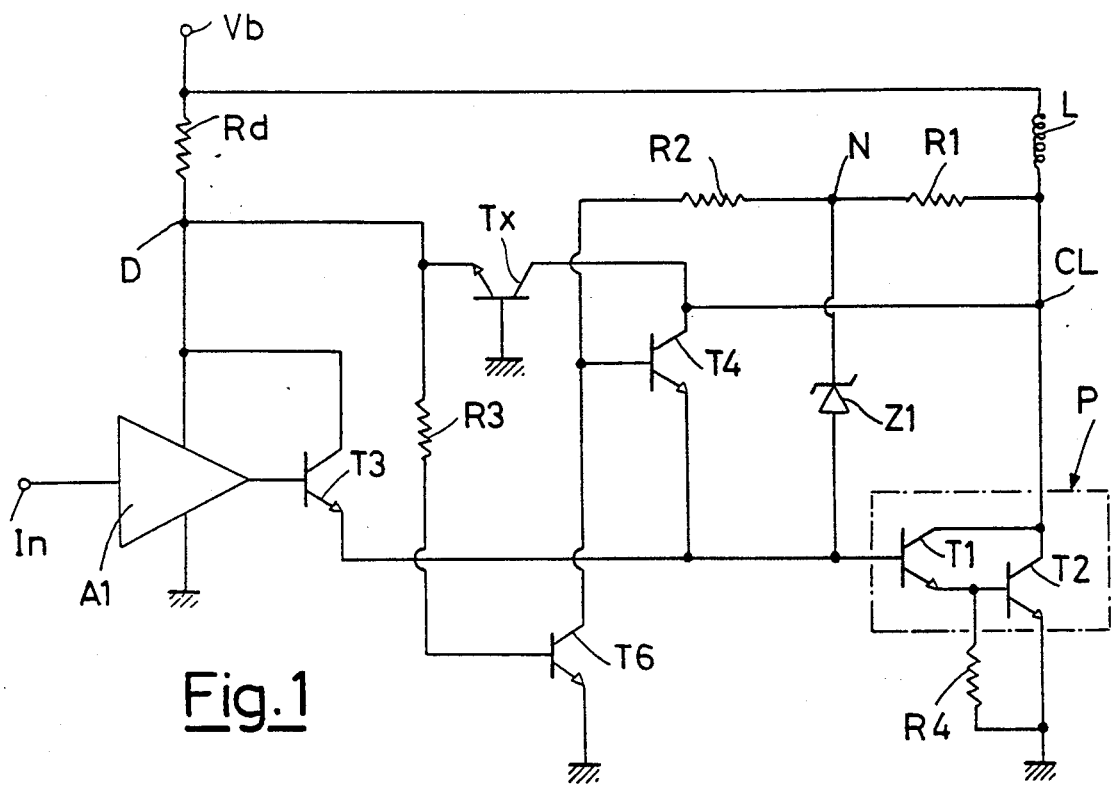
FIG. 1 illustrates a protection circuit according to the invention for a power device and related control circuit.

With reference to FIG. 1, a load L is driven by a power device P, which comprises two transistors T1 and T2, respectively, in a darlington configuration supplied with a voltage Vb and driven by a transistor T3, whose base is connected to the output of a control circuit constituted by a driver amplifer A1 suitable for receiving an input signal In. The collector of the transistor T3 is connected to a circuit node D, in turn connected to the power supply of amplifier A1 and, by means of a resistance Rd, to the power supply source Vb, while the emitter is connected to the base of transistor T1. A resistor R4 connects the base of transistor T2 to the emitter of the same transistor T2 and to ground. With the power device, between the collector and the base of transistor T1, there is associated a voltage limiter, comprising a transistor T4, which has its collector connected to a circuit node CL in turn connected to the collector of transistor T1, the emitter connected to the base of transistor T1 and the base connected, on one side, to the collector of transistor T1 through a series of resistors R2, R1, an intermediate node of which is connected to the base of transistor T1 through a clamp zener diode Z1, on the other side to the collector of a bipolar transistor T6 suitable for activating and interdicting transistor T4. Said transistor T6 has the emitter grounded and the base connected to the circuit node D through a resistor R3.

The accomplishment of the circuit of FIG. 1 in the form of an integrated circuit determines, in a known way, the formation of a parasite transistor Tx, which has its collector connected to the collector of transistor T4, its base connected to ground and its emitter connected to the circuit node D.

Figure 2:
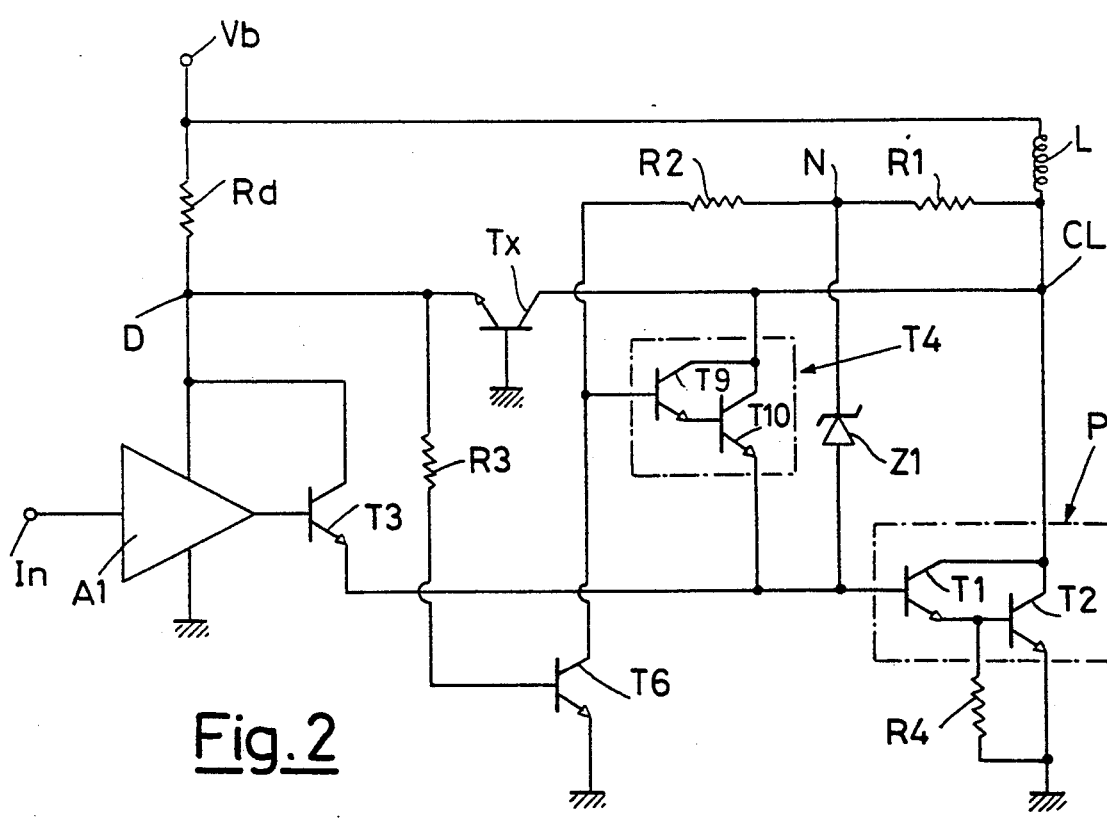
FIG. 2 represents the same circuit of FIG. 1 wherein the limiter is accomplished with a darlington configuration.

As shown in FIG. 2, it is possible to replace transistor T4 with two darlington configuration transistors T9, T10, with the object of reducing the voltage across the load.

Figure 3:
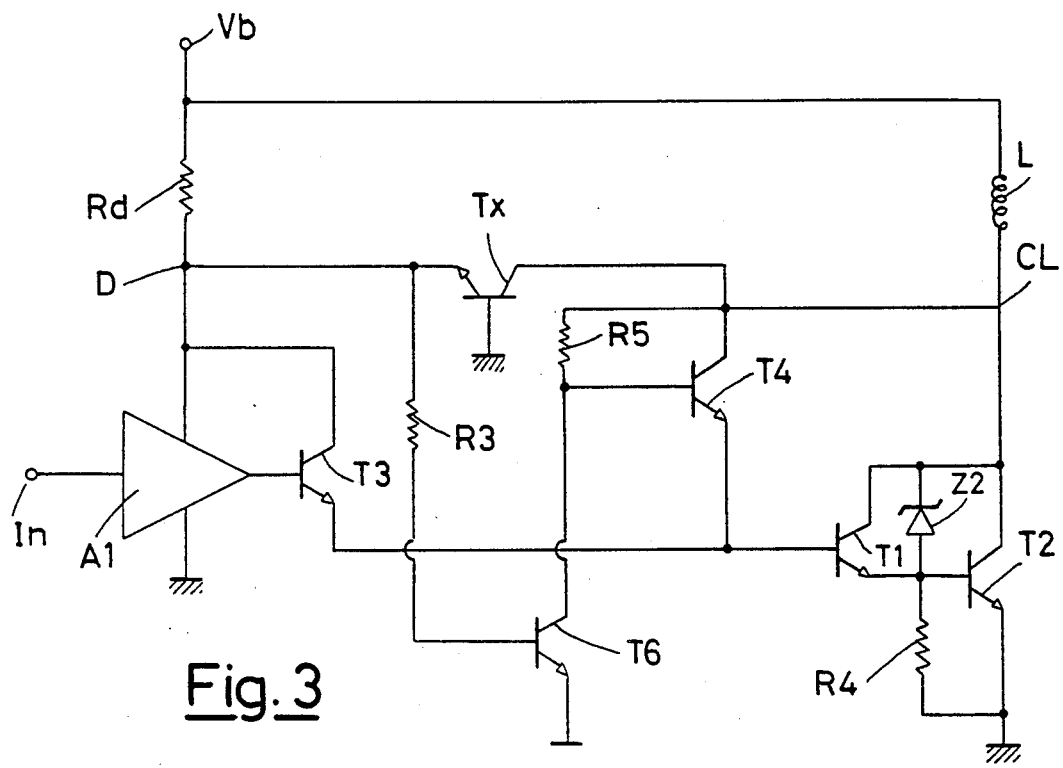
FIG. 3 represents a modification of the circuit of FIG. 1.

As illustrated in FIG. 3, it is possible to modify the circuits of FIGS. 1, 2 by the introduction of a clamp zener diode Z2 integrated directly into the power device in a darlington configuration. In such a case zener Z1 is not present. It is also possible to replace transistors T4, T6 with NPN darlingtons.

Figure 4:
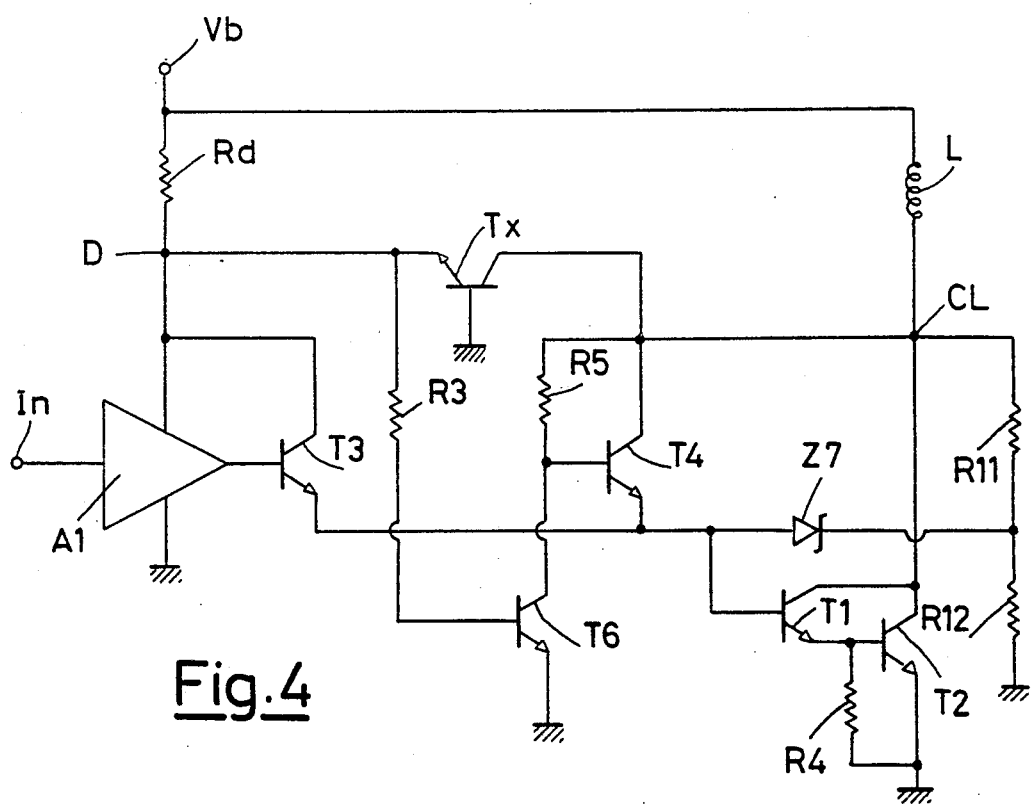
FIG. 4 illustrates the circuit of FIG. 3 wherein the voltage limiting circuit has been modified.

The protection circuit according to the invention, essentially constituted by transistors T4 and T6, is applicable for any clamp circuit used, as is seen in the further example of FIG. 4, obtained starting with the circuit of FIG. 3 removing zener Z2 from the power circuit in a darlington configuration and introducing zener Z7 between the base of transistor T1 and a node intermediate between a series of resistances R11, R12.

Figure 5:
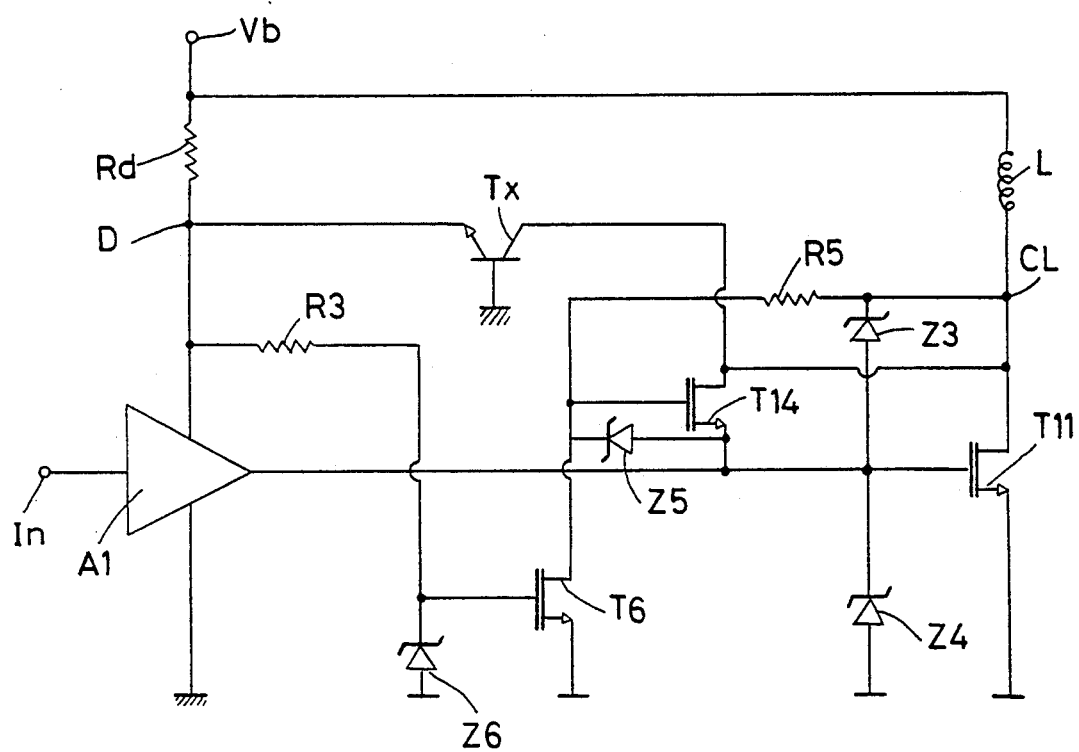
FIG. 5 illustrates the accomplishment of the same circuit of FIG. 1 in the MOS technology.

FIG. 5 illustrates an accomplishment in the MOS technology. In particular the power device is shown with an MOS transistor T11, gate driven by amplifier A1 and having the source connected to ground and the drain connected to the load L at the node CL. In parallel to transistor T11 there is a series of two zeners Z3 and Z4; in particular Z3 connects the drain of transistor T11 to the corresponding gate, Z4 is on one side connected to the gate of transistor T11 and at the other extremity it is connected to ground. To the gate of the power device, transistor T11, there is connected the drain of an MOS transistor T14, which forms part of a voltage limiter and has the drain in common with the power device T11. Between the source and the gate of transistor T14 there is a zener Z15; in addition, the gate and the drain of the same are connected together through a resistor R5. The gate of transistor T14 is connected to the drain of transistor T6, still with a switching function and also in the MOS version. The source of transistor T6 is connected to ground, the gate is connected through a series of resistors R3, Rd to the power supply source Vb. To the gate of transistor T6 there is connected a zener Z6 which is grounded at the other extremity. Parasite transistor Tx has the collector connected to the drain of transistor T14, the emitter connected to a node intermediate between resistors Rd and R3 and the base connected to ground.

With reference to FIG. 1, the protection circuit operates as follows. When the supply voltage Vb is positive, transistor T6 is kept saturated through resistance R3, which activates its base. Thus the collector of T6 is at a voltage Vast which is very low and T4 is interdicted. As a consequence, coincidental with the cut-offs of the power device controlled by the control circuit on the input In, there is established in the node CL a positive overvoltage set by zener Z1, by resistances R1, R2 and by darlington T1, T2. If in such a condition (darlington off) there is a negative supply overvoltage Vb, the latter cuts off transistor T6 as it is no longer supplied through resistor R3. T4 enters into conduction, since its base is connected to the node CL by the series of resistances R1, R2. The emitter of T4 switches on output darlington T1, T2, which limits its own collector voltage and thus the voltage across node CL. There is thus limited in this way the current and as a consequence the dissipation of power through parasite transistor Tx whose emitter, connected to the power supply Vb, is subjected to the negative overvoltage and whose collector is connected to node CL. Thus transistor Tx remains integral.

As illustrated in FIG. 2 it is possible to reduce said voltage across the load at node CL by replacing transistor T4 with two transistors T9, T10 in a darlington configuration.

Transistor T4 may possibly be missing and its function is then executed by the clamp zener diode Z1.

As illustrated in FIG. 3 provision can be made for the introduction of a clamp zener Z2 directly integrated in darlington T1, T2, to replace zener Z1.

It is possible, as illustrated in FIG. 4, to modify the voltage limiting circuit. Such a variant provides for the grounding of resistor R12 and the introduction of a resistor R5 between the collector and the base of transistor T4.

The operation described is also applicable to the case of the accomplishment with the MOS technology as illustrated in FIG. 5. In particular, when there is a positive power supply voltage, the voltage across the load, at the node CL, is determined solely by zener Z3. When there is a negative voltage across the battery, T6 is interdicted, T11 is interdicted. The voltage across the load, at the node CL, tends to rise sharply, triggering T14 through R5 which activates the gate of T11 which enters into conduction and limits its own drain voltage. The voltage across the load at node CL is thus limited.

I claim:

1. A protection circuit for protecting an integrated circuit including a power device and a control circuit therefor against negative overvoltages of a power supply, comprising:
    a voltage limiting switch interposed between a supply terminal and a control terminal of the power device, said voltage limiting switch comprising a transistor of one conductivity type; and
    Switching means interposed between a control terminal of the voltage limiting switch and ground, the switching means comprising a transistor having the same conductivity type as that of the transistor of said voltage limiting switch and having a control terminal connected to said power supply to cause the voltage limiting switch to fire the power device if a negative overvoltage of said power supply is combined with a positive overvoltage on the supply terminal of the power device, and wherein said power device comprises a transistor having the same conductivity type as the transistor of both the voltage limiting switch and the switching means.

2. A protection circuit according to claim 1, wherein said switching means is an NPN transistor.

3. A protection circuit according to claim 2, wherein said voltage limiting switch is an NPN transistor.

4. A protection circuit according to claim 2, wherein said voltage limiting switch is a darlington circuit.

5. A protection circuit according to claim 1, wherein said switching means is a MOS transistor.

6. A protection circuit according to claim 5, wherein said voltage limiting switch is a MOS transistor.

7. In a protection circuit for protecting the parasite transistor formed in an integrated circuit between a supply terminal of a power device, having a control terminal, and a power supply, against negative overvoltages in the power supply, the combination comprising:
    a parasite transistor having one of its terminals connected to said supply terminal of the power device and another one of its terminals connected to the power supply;
    a switch interposed between the supply terminal and the control terminal of the power device; and
    switching means responsive to the negative overvoltage of the power supply to cause said switch to actuate said power device to thereby simultaneously reduce the voltages on the supply terminal of the power device and said one of the terminals of the parasite transistor.

8. A circuit according to claim 7 wherein both the switch and the power device are comprised of at least one transistor, each being of the same conductivity type.

* * * * *